Patented Mar. 10, 1925.

1,529,099

UNITED STATES PATENT OFFICE.

DIEGO VÉRON, OF CHICAGO, ILLINOIS, ASSIGNOR TO THE W. E. LONG CO., OF CHICAGO, ILLINOIS, A CORPORATION OF ILLINOIS.

METHOD OF REPRODUCING CELLULAR PRODUCTS IN GRAPHIC FORM.

No Drawing. Application filed August 22, 1924. Serial No. 733,555.

*To all whom it may concern:*

Be it known that I, DIEGO VÉRON, a citizen of the country of Switzerland, residing at Chicago, in the county of Cook and State of Illinois, have invented certain new and useful Improvements in Methods of Reproducing Cellular Products in Graphic Form, of which the following is a specification.

This invention relates to a process for the graphic reproduction in an accurate manner of the intricate design of the cell structure of such commodities as baked products, bread, for example.

It has been customary heretofore to photograph a cellular structure, such as exists in a bread loaf, whenever a permanent record is desired. This method of procedure requires much skill and is too expensive to be widely applicable for general commercial purposes. It furthermore does not produce a true and correct picture of the cellular structure of the bread slice, because the shadows of the many cell cavities give to the cells a peculiar distorted appearance.

The cellular structure of a loaf of bread, commonly called texture and grain, is of great importance to the baker, because both are indicative of the soundness of the flour and baking procedure used. Certain faulty treatments of a dough, are clearly indicated in a defective grain and texture. It is, therefore, of great importance to have a permanent and accurate record of this texture. This will provide the means to check on the daily production, and thus help to maintain an even quality of bread at all times.

The primary purposes and objects of my invention are, firstly, to treat the surface of a bread slice in such a way as to give it strength and rigidity; secondly to apply a thin film of an absorbent material on the bread cells, which, prepared in this way, will readily absorb any hectographic or printer's ink; and, thirdly, to use the thus prepared bread slice after the manner of a printing stamp on an ink pad. This treatment results in a reproduction of the cellular structure of a bread slice, and also permits the bread to take up enough hectographic ink to be reproduced a hundred or more times from the same master sheet.

In carrying out the present invention, a freshly cut bread slice is dipped into, or otherwise covered, with a quick drying lacquer containing a certain amount of diatomaceous earth. The liquid part of the lacquer will almost instantly evaporate and leave a fine film on and around the cell walls of the bread texture. This film fortifies the cell walls to a point of rigidness that prevents any blurring of the reproduction, which otherwise would take place. The film of lacquer, furthermore, contains a material that absorbs printer's ink with great avidity, yet releases it readily when slightly compressed. The pressure required to obtain a print of the bread slice is so slight—due to the large amount of ink retained in the lacquer film—that no distortion of the small cell walls is possible.

To further illuminate the working of my invention, I will give in full details the proportions to be used in the preparation of the lacquer, as well as the procedure which preferably should be followed.

Three ounces of cellulose acetate are dissolved in five pounds ten ounces of acetone. To this seven ounces of infusorial earth are gradually added under constant stirring. The object is to obtain a very fine lump-free suspension. I have found it very convenient to use for this purpose a small mixer revolving at a high speed, for example, a drink mixer. The freshly cut bread slice is then dipped into this lacquer, blown dry by means of a fan, or otherwise. After drying, the bread slice is pressed against an ink pad preliminary to printing. If only one copy is desired, then a reproduction is made on a paper sheet by simply pressing the bread stamp against it. If a large number of copies are desired, a pad containing hectographic ink is employed, and the first copy obtained with this ink is used as a master sheet which in turn will reproduce a hundred or more copies on any commercial hectograph.

I claim:

1. The method of reproducing graphically the cellular structure of a baked product which consists in treating a slice thereof with a rigidifying material having ink absorptive properties; and thereafter in applying ink to the slice so treated preliminary to making a print therefrom.

2. The method of reproducing graphically the cellular structure of a bread slice which consists in treating the same with a rigidifying material; in applying thereto an ink absorptive material; and finally in applying ink thereto preliminary to making a print therefrom.

3. The method of reproducing graphically the cellular structure of a bread slice which consists in applying thereto a lacquer containing a mixture of infusorial earth, cellulose acetate, and acetone, whereby to strengthen its walls and render the same absorptive; and then applying thereto a printing ink preliminary to making impression copies therefrom.

4. The method of reproducing graphically the cellular structure of a bread slice which consists in applying thereto a quick drying lacquer containing infusorial earth; and in applying ink to the slice so treated preliminary to making impression copies therefrom.

DIEGO VÉRON.

Witness:
 EPHRAIM BANNING.